US012775842B2

(12) United States Patent
Lo et al.

(10) Patent No.: US 12,775,842 B2
(45) Date of Patent: Oct. 27, 2026

(54) SYSTEM AND METHOD FOR PREDICTING USER INTENT VIA DUAL-TOKENIZER TRANSFORMER PROCESSING OF HETEROGENEOUS SESSION SEQUENCES

(71) Applicant: Microsoft Technology Licensing, LLC, Redmond, WA (US)

(72) Inventors: Chun Lo, Mountain View, CA (US); Lu Chen, Sunnyvale, CA (US); Ajith Muralidharan, Sunnyvale, CA (US); Lingjie Weng, Sunnyvale, CA (US); Mohan Premchand Bhambhani, Sunnyvale, CA (US); Zichu Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 646 days.

(21) Appl. No.: 18/216,237

(22) Filed: Jun. 29, 2023

(65) Prior Publication Data

US 2025/0005346 A1 Jan. 2, 2025

(51) Int. Cl.
*G06N 3/08* (2023.01)
*H04L 67/1396* (2022.01)
*H04L 67/50* (2022.01)

(52) U.S. Cl.
CPC ........... *G06N 3/08* (2013.01); *H04L 67/1396* (2022.05); *H04L 67/535* (2022.05)

(58) Field of Classification Search
None
See application file for complete search history.

(56) References Cited

PUBLICATIONS

Chen et al., Behavior Sequence Transformer for E-commerce Recommendation in Alibaba, DLP-KDD, Aug. 5, 2019, Anchorage, AK, USA; © 2019 Association for Computing Machinery; Total pp. 5 (Year: 2019).*
Xia et al., TransAct: Transformer-based Realtime User Action Model for Recommendation at Pinterest; arXiv:2306.00248v1 [cs.IR] May 31, 2023; Total pp. 11 (Year: 2023).*
Sun et al., BERT4Rec: Sequential Recommendation with Bidirectional Encoder Representations from Transformer; arXiv: 1904.06690v2 [cs.IR] Aug. 21, 2019; Total pp. 11 (Year: 2019).*
Zhang et al., Feature-level Deeper Self-Attention Network for Sequential Recommendation; Proceedings of the Twenty-Eighth International Joint Conference on Artificial Intelligence (IJCAI-19); pp. 4320-4326 (Year: 2019).*
"Rand index", Retrieved From: https://en.wikipedia.org/wiki/Rand_index, Sep. 17, 2022, 4 Pages.
(Continued)

*Primary Examiner* — Alan Chen
(74) *Attorney, Agent, or Firm* — Cantor Colburn LLP; Renee D. Brown

(57) ABSTRACT

In an example embodiment, a user's session sequence data is utilized to provide a universal member representation that achieves one or more of the following goals:
1. Provides a user-level representation that enables the prediction of future actions based on historical interactions within different domains
2. Provides a user representation that allows better clarification of user intent (e.g., network builder, job seeker, profile scraper, etc.)
3. Members with similar/behaviors/intent are easily identified
4. Less sensitivity to activity levels of members.

17 Claims, 10 Drawing Sheets

(56) References Cited

PUBLICATIONS

"Silhouette (clustering)", Retrieved From: https://en.wikipedia.org/wiki/Silhouette_(clustering), Jan. 30, 2023, 4 Pages.
Chopra, et al., "Learning a Similarity Metric Discriminatively, with Application to Face Verification", In Proceedings of Computer Society Conference on Computer Vision and Pattern Recognition, Jun. 20, 2005, 8 Pages.
Devlin, et al., "BERT: Pre-training of Deep Bidirectional Transformers for Language Understanding", In Repository of arXiv:1810.04805v1, Oct. 11, 2018, 14 Pages.
Kong, et al., "A Mutual Information Maximization Perspective of Language Representation Learning", In Repository of arXiv:1910.08350v1, Oct. 18, 2019, 12 Pages.
Le, et al., "Distributed Representations of Sentences and Documents", In Repository of arXiv:1405.4053v2, May 22, 2014, 9 Pages.
Pal, et al., "PinnerSage: Multi-Modal User Embedding Framework for Recommendations at Pinterest", In repository of arXiv:2007.03634v1, Jul. 7, 2020, 10 Pages.
Vaswani, et al., "Attention is All you Need", In Proceedings of Advances in Neural Information Processing Systems 30, Dec. 4, 2017, 11 Pages.
Yi, et al., "Sampling-Bias-Corrected Neural Modeling for Large Corpus Item Recommendations", In Proceedings of the 13th ACM Conference on Recommender Systems, Sep. 16, 2019, 9 Pages.
U.S. Appl. No. 18/208,199, filed Jun. 9, 2023.

* cited by examiner

SYSTEM AND METHOD FOR PREDICTING USER INTENT VIA DUAL-TOKENIZER TRANSFORMER PROCESSING OF HETEROGENEOUS SESSION SEQUENCES

TECHNICAL FIELD

The present disclosure generally relates to technical problems encountered in machine learning. More specifically, the present disclosure relates to user intent learning with session sequence data.

BACKGROUND

The rise of the Internet has occasioned two disparate yet related phenomena: the increase in the presence of online networks, with their corresponding user profiles visible to large numbers of people, and the increase in the use of these online networks for various reasons. The result is that a large number of people often interact with various pieces of information on the Internet. For example, search engines or feed engines often return a number of different information results to a graphical user interface, for display to a user (who may or may not have explicitly searched for information).

Artificial intelligence, and specifically machine learning models, may be used as recommender systems that recommend content for display to a user. For example, a recommender system may be designed to determine which content to display in a user's "feed" on an online platform (the feed being an area of a display where content items are shown to users, often in reverse chronological order based on when the content was generated or otherwise made ready for display).

BRIEF DESCRIPTION OF THE DRAWINGS

Some embodiments of the technology are illustrated, by way of example and not limitation, in the figures of the accompanying drawings.

DETAILED DESCRIPTION

Figure 1:
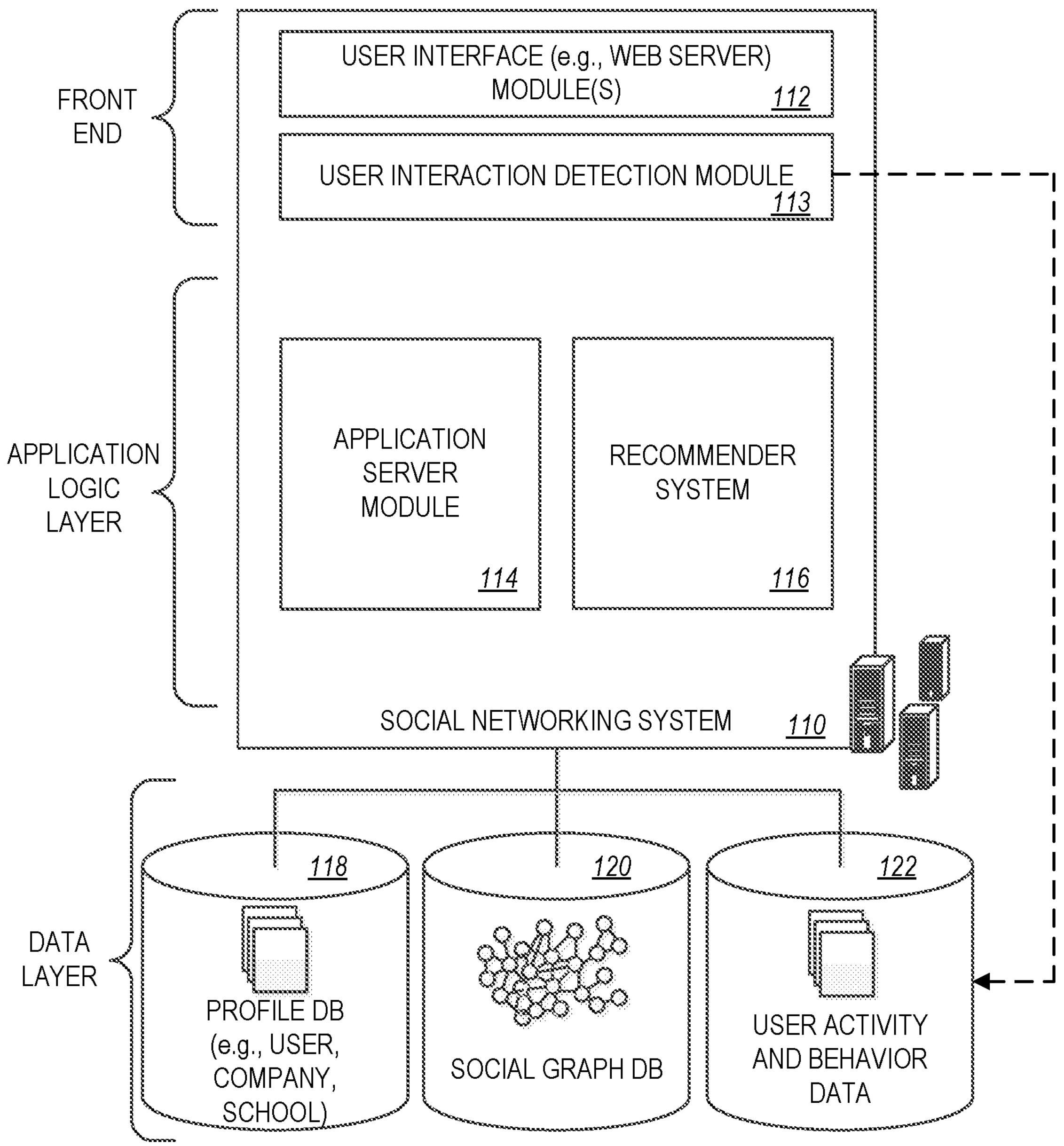
FIG. 1 is a block diagram showing the functional components of a social networking service, including a data processing module referred to herein as a search engine, for use in generating and providing search results for a search query, consistent with some embodiments of the present disclosure.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Recommender systems, however, utilize domain-specific data in making the predictions/ranking of content items it is considering for recommendation and/or display. Domain-specific data in this context means data pertaining specifically to the domain in which the recommender system was designed to perform. For example, a feed-related recommender system might utilize information about content items previously displayed within users' feeds in making its recommendations. In the case of machine learning models, the recommender models may be trained using this domain-specific data.

Some online platforms contain multiple domains in which users interact with content, and thus often have multiple recommender models, one for each domain in the online platform. Users, however, may interact with multiple types of content during a single session to achieve their goals. For example, a job seeker may follow pages to get the latest news of a favorite company/industry, connect with people who can refer them to a job, search and apply for job openings, message recruiters for job opportunities, etc. A content creator can utilize a feed to get the latest news and creation ideas, follow other power creators/influencers to expand their professional networks, and rely on notifications to get instant updates from their audience.

The interactions of a user with heterogeneous items (i.e., items of different domains, such as job listings, feed items, messages, etc.) provide a more holistic view of user behaviors, and potentially a better understanding of user intent and interests. This is especially true for users with limited engagements in particular domains, as signals from other domains can provide significant lift in model performance and user experience. Providing information that includes information about multiple types of content to a single machine learning model is rare, but even one that does will do so utilizing an aggregation approach. In an aggregation approach it is assumed that all user-item interactions are equally important, and all of the different types of user-item interactions are combined into a single group. This ignores, however, the order of the interactions, which can convey important information about a user's predicted next action, as such an action may depend not only on their long term goal but may also be related to the current context and/or short-term intent. As such, in some example embodiments, sequential dependencies in a user's interactions are captured.

In an example embodiment, a user's session sequence data is utilized to provide a universal member representation that achieves one or more of the following goals:

1. Provides a user-level representation that enables the prediction of future actions based on historical interactions within different domains
2. Provides a user representation that allows better clarification of user intent (e.g., network builder, job seeker, profile scraper, etc.)
3. Members with similar/behaviors/intent are easily identified
4. Less sensitivity to activity levels of members In order to accomplish these goals, a data set may be created in which the user's interactions with heterogeneous items across multiple domains are grouped into sessions. A session is a period of time during which a user is connected to some sort of computer service. These heterogeneous items/domains may include, for example, feed, post, people-you-may-know, follow, notification, profile view, profile edit, messaging, search, and/or job listings.

The session data is then aggregated into ordered member session sequence data:

$[(s_1, a_1), (s_1, a_2), (s_1, a_3), (s_2, a_4), (s_2, a_5) \ldots (s_{10}, a_{26}]) \ldots]$ where $s_i$ is session i, $a_j$ is action j-related features (e.g., page viewed, action taken, item type, item actor, time, etc.), and a sequence can contain multiple sessions.

In an example embodiment, the sequence data includes information about the following action-related features: the service in which the action was performed, the action type, the item on which the action was performed, and the actor for the item (generally the creator of the item). Thus, for example, if a user performed a "Like" action on a feed article-i created by member-x, performed a "Share" action on a feed article-j created by company-y, and then later performed an "invite" action on an alumnus named "member-z" in a "People-You-May-Know" (PYMK) service, then an example sequence may be as follows:

[(s_1, "Feed", "Like", "article-i", "member-x"), (s_1, "Feed", "Share", "article-j", "company-y"), (s_2, "PYMK", "Invite", "Alumni", "member-z")].

In other example embodiments, additional action-related features may be incorporated into the sequence, such as object type (e.g., notification type, feed update type, search entity type, etc.), and time (e.g., time to first action, time to last session, etc.).

The sequential nature of the input data enables a system of an example embodiment to learn member embeddings that are capable of being used to predict the user's next actions.

More particularly, in an example embodiment, transformer-based sequence models are used to learn user embeddings. A user embedding block transforms user (sequence) data into embeddings. This user embedding block can then serve as a basic building block for supervised and unsupervised embedding training, as well as for inferencing.

FIG. 1 is a block diagram showing the functional components of a social networking service, including a data processing module referred to herein as a recommender system, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based Application Program Interface (API) requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118 or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by a recommender system 116 to determine content to recommend to a user.

Although not shown, in some embodiments, a social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the recommender system 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The recommender system 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The recommender system 116 may collect, parse, and/or store data in an index or other similar structure to facilitate the identification and retrieval of information in response to received queries for information. This may include, but is not limited to, forward search indexes, inverted indexes, N-gram indexes, and so on.

At a threshold level, the present solution provides for the connecting of isolated optimization components and the continued automation of each component through artificial intelligence technologies.

Figure 2:
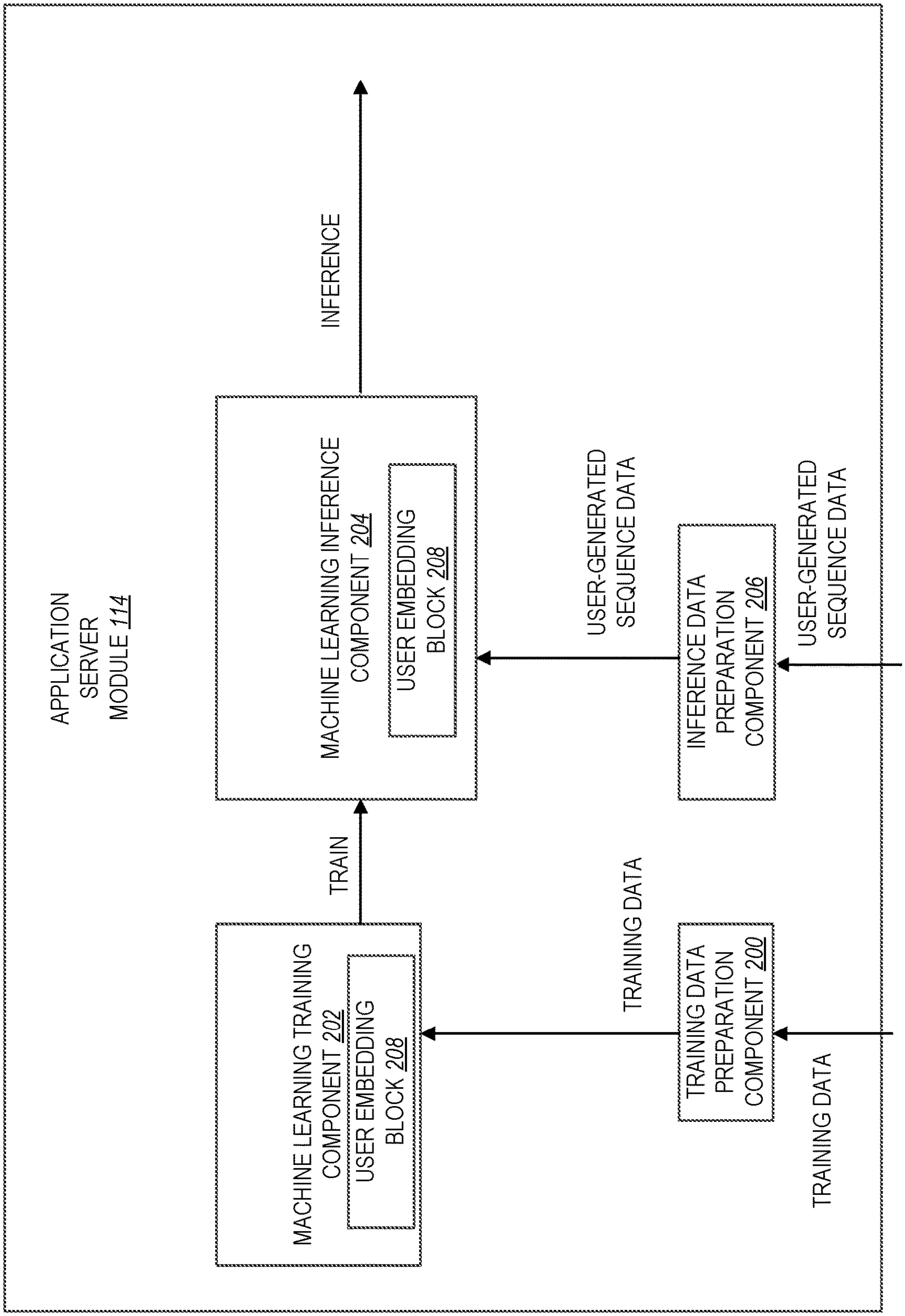
FIG. 2 is a block diagram illustrating application server module of FIG. 1 in more detail, in accordance with an example embodiment.

FIG. 2 is a block diagram illustrating application server module 114 of FIG. 1 in more detail, in accordance with an example embodiment. While in many embodiments the application server module 114 will contain many subcomponents used to perform various different actions within the social networking system 110, in FIG. 1, only those components that are relevant to the present disclosure are depicted.

Here, application server module 114 includes a training data preparation component 200, which obtains training data, in the form of either historical sequences (and corresponding information), or sequences that have been artificially generated for training purposes (and corresponding information). This training data is then prepared by the training data preparation component 200. This preparing may include, for example, transforming the training data into a format to be accepted by a machine learning training component 202, such as by filtering, reordering, embedding, and/or otherwise reformatting or altering the training data.

The machine learning training component 202 then takes as input this training data and uses this information to train a machine learning inference component 204. At inference time, the machine learning inference component 204 is then able to use user-generated sequence data provided by an inference data preparation component 206, as well as additional data, to perform an inference, such as a prediction that a user will respond favorably if a particular piece of content is presented (e.g., recommended) to the user. "Favorably" in this context could mean different things in different contexts (e.g., interacting with the piece of content, applying for a job associated with the piece of content, performing some future interaction with the online platform, etc.).

Each of the machine learning training component 202 and the machine learning inference component 204 contain a user embedding block 208. The purpose of the user embedding block 208 is to output an embedding for a user based on information known about the user (e.g., from a user profile) and the user's previous actions in the online platform (e.g., sequence data). In the machine learning training component 202, each user whose data is part of the training data will be the subject of an execution of the user embedding block 208. At inference-time, in the machine learning inference component 204, a user whose is being considered for recommended pieces of content is the subject of an execution of the user embedding block 208. In both instances, however, the embedding block 208 essentially functions in the same way-encoding sequences of actions taken by the user, transforming those encoded sequences, and concatenating them to embeddings of the user information to create a concatenated embedding representing both the user data and the user's actions.

The machine learning inference component 204 may be trained by any machine learning algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the machine learning algorithm, used to train the machine learning model, may iterate among various weights (which are the parameters) that will be multiplied by various input variables (such as encoded sequences or portions of sequences) and evaluate a loss function at each iteration, until the loss function is minimized, at which stage the weights/parameters for that stage are learned. Specifically, the weights (e.g., values between 0 and 1) are multiplied by the input variables as part of a weighted sum operation, and the weighted sum operation is used by the loss function.

In some example embodiments, the training of the machine learning model may take place as a dedicated training phase. In other example embodiments, the machine learning model may be incrementally retrained dynamically at runtime by the user providing live feedback.

The machine learning inference component 204 may utilize the user embeddings for any number of different purposes. Where the machine learning inference component 204 is itself a neural network, the user embeddings can be included as a feature in an input layer. The neural network then learns, during the training of the neural network, which dimensions are important as well as affinities between users and entities/items.

Where the machine learning inference component 204 is a non-neural network model, such as an XGBoost model, the user embeddings can first be used to calculate similarity scores or affinity scores between users and other users, or between users and entities. These scores may then be used as input to the XGBoost model rather than the embeddings being used directly, to ensure that the XGBoost model operates efficiently as processing embedding features directly can quickly increase the complexity of the model due to their large dimension size.

In some example embodiments, the machine learning inference component 204 may be implemented as a two-tower application specific (multi-task) model that fine-tunes user embeddings so that the similarity of the user embeddings is directly related to the tasks on which the model is optimized. This allows for, for example, efficient user-to-user recommendations. For example, if a source user embedding is similar to a destination user embedding, they are more likely to send/accept connection invitations. This fine tuning is useful because users with similar session patterns may not necessarily indicate that they wish to connect. With a two-tower structure, a similarity score of any user pairs can be provided, which a downstream application could use as a single numerical feature.

User-entity affinities can be provided by having the machine learning inference component 204 be a contrastive learning model. More particularly, the downstream application can use the action building block portion of the user embedding block 208 to progenerate action/item embeddings for different potential item/entity pairs (e.g., different potential notification types for a target user). The similarity score of these action/item embeddings and the user embeddings generated from the user building block portion of the user embedding block 208 can act as an affinity score that can be used as an input feature to the machine learning inference component 204.

Additionally, due to the distance relationship inherent in the embeddings, the user embeddings can further be used to generate candidates. For example, assume that the distance of embeddings is related to a particular application objective, then if a user B is a good candidate for user A, then any users that are close to user B in the embedding space may also be good candidates for user A.

Additionally, the concept of an "analogy property" can be incorporated into the embeddings. For example, if it is observed that a job seeker in the IT field connects with a recruiter in the IT field, the relationship and distance between the embedding of the job seeker and the embedding of the recruiter in the n-dimensional space can be used to identify candidates for a recruiter in a different field, such as in the medical field.

Figure 3:
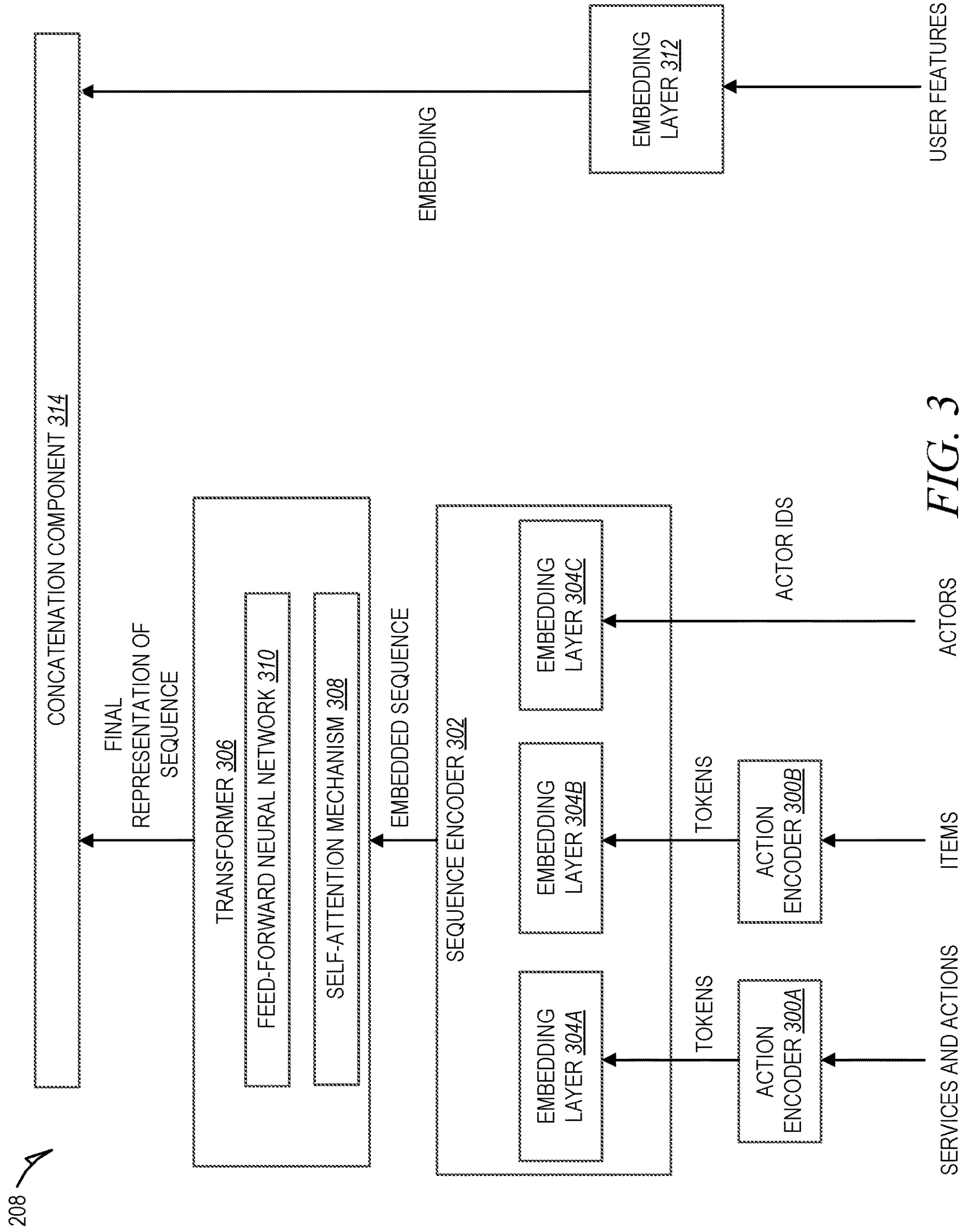
FIG. 3 is a block diagram illustrating the user embedding block in more detail, in accordance with an example embodiment.

FIG. 3 is a block diagram illustrating the user embedding block 208 in more detail, in accordance with an example embodiment. A plurality of action encoders 300A-300C that each take a portion of an input sequence and convert it to a unique token. In an example embodiment, collectively the action encoders 300A-300C encode all of the action-related features in the sequence. Here, there are three encoders 300A-300C depicted, but other embodiments may include a different number of encoders. The first encoder 300A encodes the combination of the service and the action type. Thus, encoder 300A takes the service types and action types in the sequence and tokenizes them (using a tokenizer) to a unique token, such as an integer. For example, the combination "Feed: like" would be tokenized to a first integer, and every time that the combination of "Feed: like" appears in the sequence it would be translated to that first integer. Meanwhile, the combination of "Feed: share" would be tokenized to a second integer different from the first integer, and every time that the combination of "Feed: share" appears in the sequence it would be translated to that same second integer. Likewise, the combination of "PYMK: invite" would be tokenized to a third integer different than the first and second integers, and every time the combination of "PYMK: invite" appears in the sequence it would be translated to that same third integer.

The second encoder 300B encodes the item identifications on which the action was performed. Like with the first encoder 300A, the second encoder 300B takes the item identifications and tokenizes them (using a tokenizer) to a unique token, such as an integer. For example, "article" would be tokenized to a first integer, and every time that "article" appeared in the sequence it would be translated to that first integer. Likewise, "alumni" would be tokenized to a second integer different than the first integer, and every time that "alumni" appeared in the sequence it would be translated to that second integer.

No encoder is needed for actors, because actors are already identified by unique identifications, which can be passed directly to the embedding layer 304C, as described below. These unique identifications are essentially already tokens. The same would be true for any identification-based input.

The tokenized sequence is passed to a sequence encoder 302, which acts to perform embeddings on each of the tokens in the tokenized sequence. Thus, in an example embodiment, the sequence encoder 302 includes separate embedding layers 304A, 304B, and 304C, for each action encoder 300A, 300B, and 300C, respectively. Each embedding layer 304A, 304B, 304C embeds a different action-related feature or a combination of action-related features. Thus, for example, embedding layer 304A may embed the tokens pertaining to the combination of service and action type, embedding layer 304B may embed the tokens pertaining to item identification, and embedding layer 304C may embed the actor identifications. It should be noted, however, that this 1:1 correspondence between embedding layers and action encoders is optional, and in some example embodiments the outputs of one or more of the action encoders 300A, 300B, 300C are assigned to a pre-specified embedding, such as an embedding provided from an external system.

Each embedding layer 304A, 304B, 304C may be separately trained to create vector embeddings for the corresponding tokens, by learning such embeddings. Learning embeddings is a process whereby each token or combination of tokens is assigned a different set of coordinates in an n-dimensional space. Each of these sets of coordinates is considered a different embedding, and a set of coordinates is known as a vector (unlike "vectors" in the mathematical sense which are lines with directions). The relationships between the sets of coordinates in the n-dimensional space is representative of the similarity of the respective underlying pieces of data. If, for example, two items are similar to each other, then their respective tokens are embedded to embeddings that are closer to each other in the n-dimensional space, whereas items embedded to coordinates that are further from each other in the n-dimensional space are indicative that the items are dissimilar to each other. Similarity is based on the labels of the training data used to train the embedding layer 304A, 304B, 304C. More particularly, in an example embodiment each embedding layer 304A, 304B, 304C may be thought of as its own machine-learned model, which is trained using training data having pairs of tokens with labels indicative of the similarity of the corresponding underlying data of those tokens. For example, the label may be a value of either 0 or 1, with 0 indicating that the items in a pair are completely dissimilar and 1 indicating that the items in the pair are identical. The embedding layer (here, for items, it would be embedding layer 304B) then learns the similarities between various items based on this training data of the embedding layer 304B, and the embedding layer creates an embedding for unlabeled item tokens fed to it.

The output of the generated embedded sequence from the sequence encoder 302 is then passed to a transformer 306. The transformer 306 comprises a self-attention mechanism 308 and a feed-forward neural network 310. The self-attention mechanism 308 acts to help weight the importance of different tokens and to help identifying the relationship between different tokens, while the feed-forward neural network 310 applies non-linear transformations to each token's representation.

The self-attention mechanism 308 allows the system to focus on different parts of the sequence when making predictions for a particular token. It captures dependencies between tokens by assigning different weights or attention scores to each token in the sequence. These attention scores determine the importance of other tokens relative to the current token being processed. In an example embodiment, the input embeddings are transformed into query, key, and value vectors. These vectors are then used to compute the attention scores. The attention scores are computed by taking the dot product between the query and key vectors, followed by applying a softmax function to obtain a distribution over the sequence. The attention scores are then used to weight the value vectors, and the weighted sum is computed to obtain a contextual representation for each token.

For example, if a user Z connected with member A from company X and viewed an article from company X, before and after applying for a job at company X, the self-attention mechanism 308 is able to connect these events together even if they did not happen immediately before or after the job application. Understanding these relationships is powerful in predicting next actions or understanding affinities of the user.

After the self-attention mechanism 308, the feed-forward neural network 310 is applied to each token's contextual representation. The feed-forward network may compare two linear transformations with a non-linear activation function in between, such as a Rectified Linear Unit (ReLU). These operations allow the system to capture complex relationships and perform non-linear transformations on the representations.

It should be noted that while this figure depicts a single self-attention mechanism 308 and feed-forward neural network 310, in some example embodiments there are multiple layers of self-attention mechanism 308 and feed-forward neural networks 310. The number of layers is a hyperparameter that can be adjusted based on the complexity of the task and the available computational resources. More layers are able to capture more intricate dependencies but come at a computational cost for training and inferencing.

A feed-forward neural network, also known as a multilayer perceptron (MLP), is a fundamental type of artificial neural network. It is called "feed-forward" because the information flows through the network in one direction, from the input layer to the output layer, without any cycles or loops.

The feed-forward neural network comprises multiple layers of interconnected nodes, or neurons, organized in a sequential manner. Each neuron receives inputs, performs a computation, and produces an output. The outputs from one layer serve as inputs to the next layer until the final output is obtained.

A feed-forward neural network may include the following components:

Input Layer: The input layer represents the features or inputs to the network. Each neuron in the input layer corresponds to an input feature, and the values of these neurons represent the input values.

Hidden Layers: Between the input layer and the output layer, there can be one or more hidden layers. Hidden layers are composed of neurons that perform computations on their inputs. Each neuron in a hidden layer receives inputs from the previous layer and produces an output value using an activation function.

Weights and Biases: Each connection between neurons in adjacent layers has associated weights and biases. The weights determine the strength or importance of the connection, while biases act as additional constants added to the weighted sum of inputs before applying the activation function.

Activation Function: The activation function introduces non-linearities to the computations performed by each neuron. It takes the weighted sum of inputs and biases and applies a non-linear transformation, determining the output of the neuron. Activation functions may include sigmoid, tanh, ReLU, and/or softmax.

Output Layer: The output layer produces the final output of the network. The number of neurons in the output layer depends on the specific task. For regression problems, there may be a single neuron providing a continuous output. In classification problems, the number of neurons matches the number of classes, and the outputs are usually transformed using a suitable activation function (e.g., softmax) to represent class probabilities.

During the training process, the weights and biases of the network are adjusted iteratively using optimization algorithms like gradient descent. The objective is to minimize a loss function that quantifies the difference between the predicted outputs of the network and the desired outputs (targets) for a given set of inputs.

Separately, user features (such as user profile features) may be embedded using embedding layer 312. Embedding layer 312 may be similar to the other embedding layers 304A, 304B, 304C, and may also optionally include a tokenizer as well, except it may perform its embedding on user-related information such as those extracted from a user profile. It should be noted that in some embodiment, embedding layer 312 may actually be an embedding look-up that looks up embeddings that were performed using an embedding layer on a different device or component of a system. Embedding the user features improve the personalization of what will become the final embeddings.

More specifically, the embedded user features are concatenated with the output of the transformer 306 using a concatenation component 314. The result is a final embedding that represents the combination of the user and the user sequence.

Figure 4:
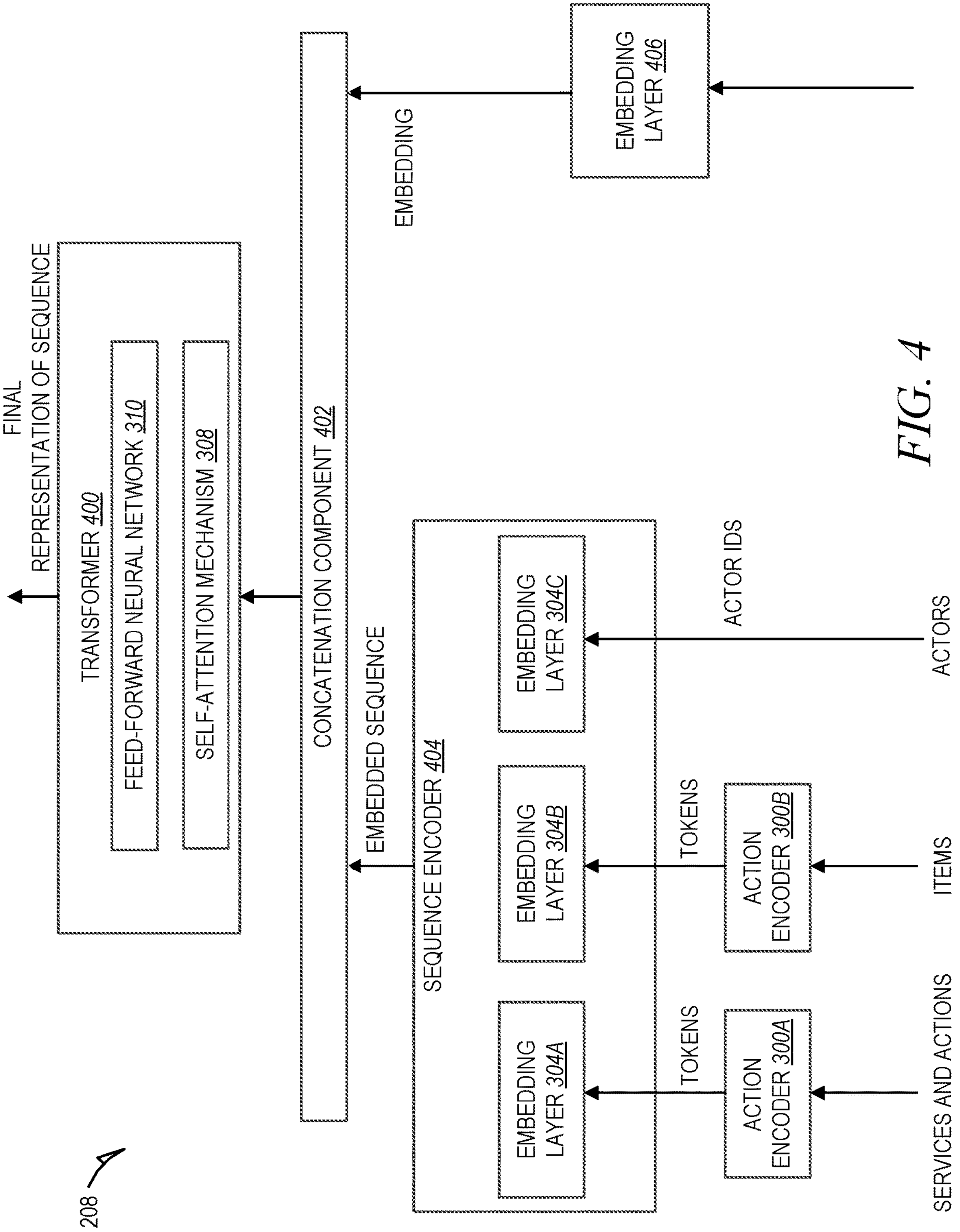
FIG. 4 is a block diagram illustrating the user embedding block in more detail, in accordance with another example embodiment.

FIG. 4 is a block diagram illustrating the user embedding block 208 in more detail, in accordance with another example embodiment. In this example embodiment, the transformer 400 is located after the concatenation component 402. Specifically, the concatenation component concatenates the encoded sequence data from the sequence encoder 404 with the embedded member features from embedding layer 406. This is similar to treating the user features as an extra element of the input sequence. This allows the transformer 400 to consider the context of the user and adds compatibility with Bidirectional Encoder Representations from Transformers (BERT) models which can be used with unsupervised training. However, it is also less flexible in setting the dimension of the transformed user features as it has the same dimension as other sequence elements. Bert applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

The other components, such as the feed-forward neural network 310, self-attention mechanism 308, and so on, are the same as described above with respect to FIG. 3.

Meaningful embeddings can be learned using learning objectives. Three different types of training may be used for the embeddings: application-specific (supervised) training, generic (unsupervised) training, and supervised fine tuning (semi-supervised). Each will be described in more detail herein.

Figure 5:
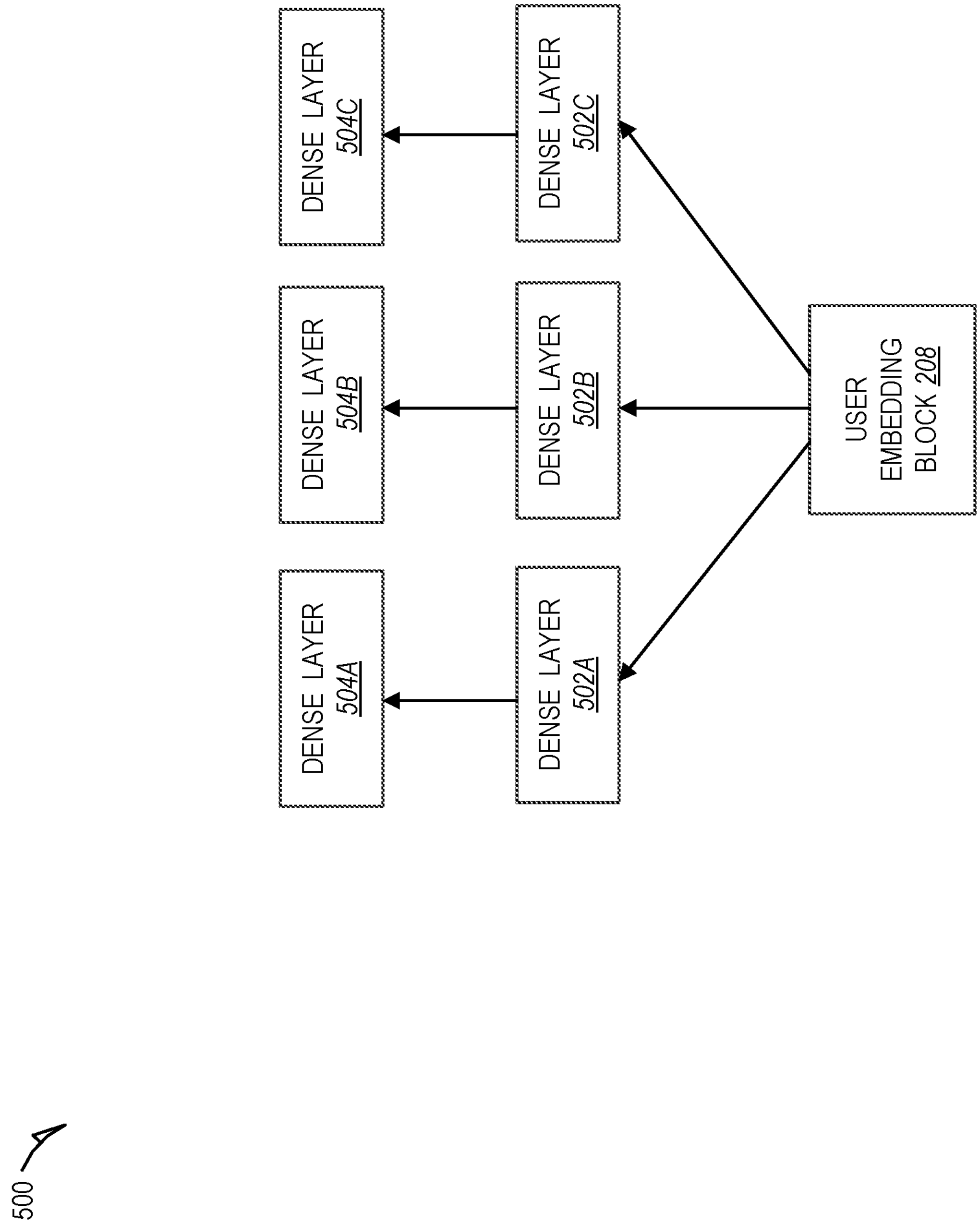
FIG. 5 is a block diagram illustrating an architecture for application-specific training, in accordance with an example embodiment.

FIG. 5 is a block diagram illustrating an architecture 500 for application-specific training, in accordance with an example embodiment. Application-specific training uses labels from applications that will use the embeddings (which will be described in more detail later). A multi-task learning framework may be provided where the output of the user embedding block 208 is used to predict each task through independent dense layers 502A, 502B, 502C. This structure allows the system to use information from multiple tasks 504A, 504B, 504C to learn generic embeddings that are useful to all the tasks. This structure provides better overall performance than learning embeddings for each individual task.

For example, a People-You-May-Know (PYMK) application may provide labels to optimize the probability of invitations to connect (first task) and the probability of acceptance of invitations (second task), while a notification application may provide labels to optimize the probability of tapping (first task) and the probability of clicking (second task). The supervised training provides the embeddings that are optimized for the target applications.

One limitation of supervised learning is the potential limited amount of training data. Large amounts of data are often required to learn high-performance embeddings. As a result, in an example embodiment, one or more unsupervised methods may be provided that only need to use historical user session data. The first is a masked language model (MLM).

The model's objective is to predict the original token that was replaced with the mask based on the context provided by the surrounding tokens. This process helps the model learn the relationships between different tokens and their contexts.

Figure 6:
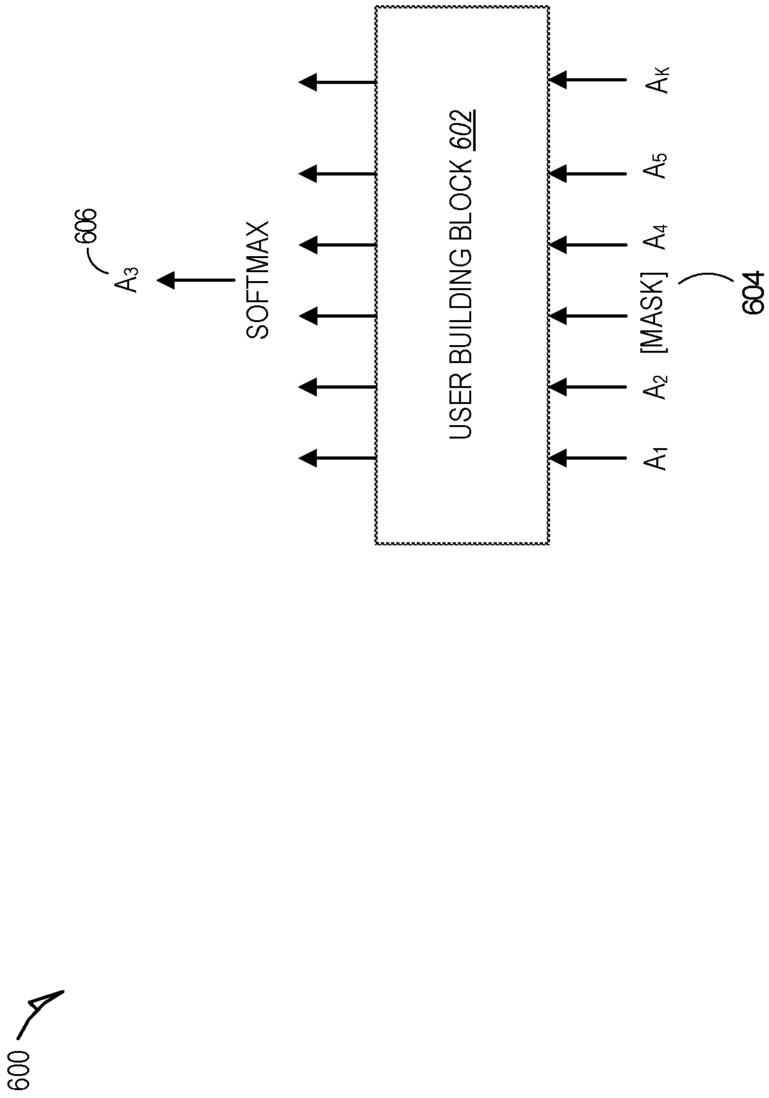
FIG. 6 is a block diagram illustrating an MLM, in accordance with an example embodiment.

FIG. 6 is a block diagram illustrating an MLM 600 in accordance with an example embodiment. MLM is the major structure of a BERT model, and uses training steps involving randomly masking input elements, using the output of the masked element to predict the original element, thereby learning the context of teach element in the session sequence through this generic training task, and outputting the user embedding. Here, therefore, masked element 604 is learned to be $A_3$ 606 by user building block 602.

The second unsupervised method is a contrastive learning model. While MLM is able to learn high quality embeddings, it can suffer from scalability issues due to the softmax calculation, especially when the cardinality of sequence elements is large. Unlike language models, the present use case tends to have a large vocabulary. Language models also suffer from large vocabulary as well. Instead of predicting the masked work directly, in an example embodiment a negative sampling method including either a correct or incorrect masked element in the input can be provided, and this method can then predict if the element in the input is the same as the masked element (i.e., a binary prediction problem instead of a softmax problem). Contrastive loss between user and item building blocks may also be used because it provides user embedding and item embedding in the same space. The distance between the user and item embeddings is related to the affinity of the user and item.

Figure 7:
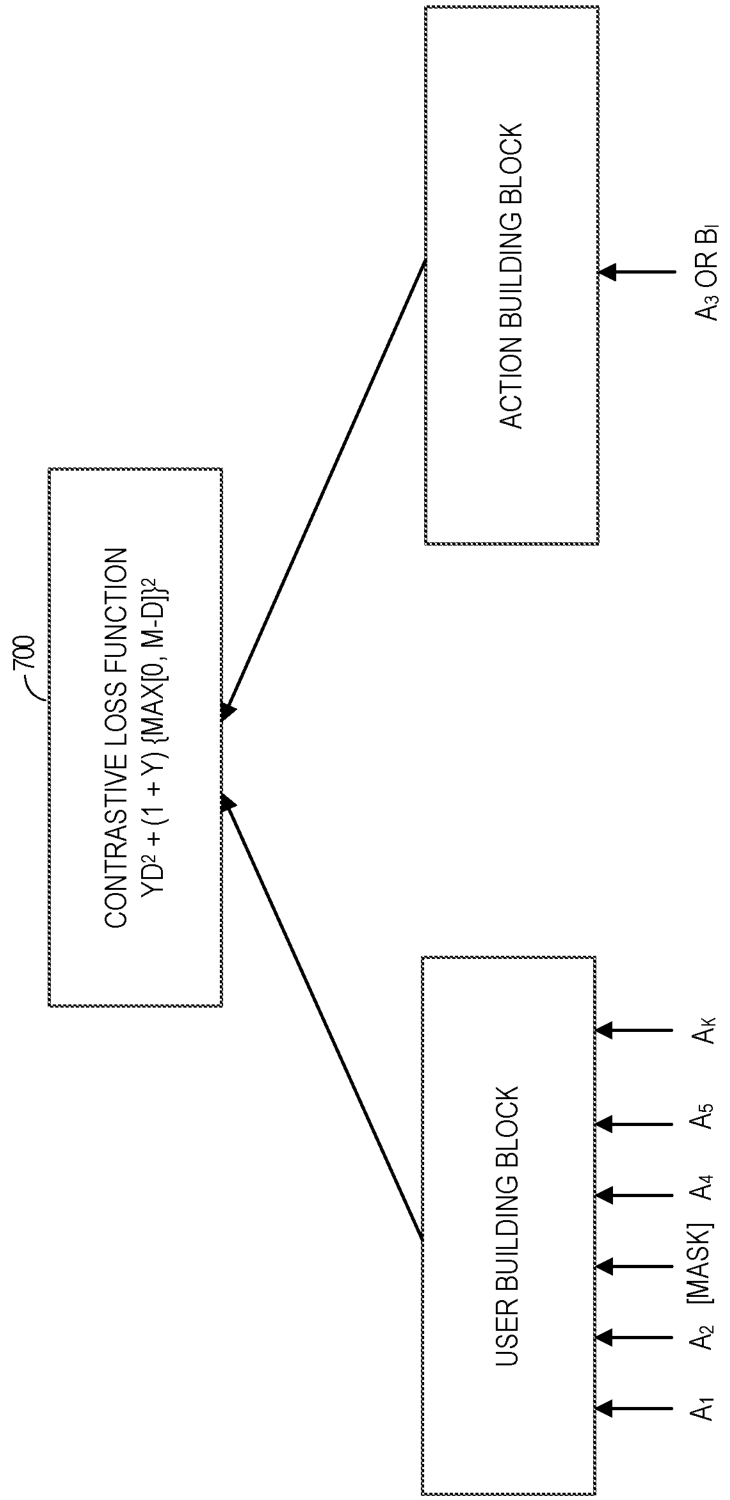
FIG. 7 is a block diagram illustrating a contrastive learning model, in accordance with an example embodiment.

FIG. 7 is a block diagram illustrating a contrastive learning model 700, in accordance with an example embodiment. The contrastive learning model 700 can be provided using the following loss function:

$$YD^2+(1-Y)\{\max(0,m-D)\}^2$$

where Y indicates if the input pair is "similar" (1) or not (0), D is the distance of the input pair, and m is the margin between similar pairs and dissimilar pairs. When the pair is similar, the loss function equals $D^2$, which minimizes the distance between them. When the pair is dissimilar, the loss function ({max (0, m−D)}$^2$ penalizes the model (embedding) when the pair has distance smaller than m. This enables the system to learn embeddings such that similar sequences will be in close proximity.

Negative actions can be randomly sampled from the action sequence of target users (hard negatives) and randomly sampled from the possible actions of other members (soft negatives). The ratio of hard and soft negatives will be a tunable hyperparameter.

Finally, the benefits from both supervised and unsupervised training can be achieved through supervised fine tuning (or semi-supervised training). Here, a generic task model is trained using the contrastive learning model, with a large amount of historical session sequence data. Then a multitask learning model with application-specific tasks is stacked on top of the generic model (or using the embedding output of the generic task model as the input of the multitask learning model)/

The tasks in the multitask learning model may be related so that the specificity of embedding can be improved while leveraging knowledge/data between tasks.

As mentioned earlier, the user/user sequence embedding may be utilized by a number of different types of applications, most notably various machine learning models trained to perform various tasks. In such embodiments, the user/user sequence embeddings are used as features in downstream machine learning model training and inference. This may include utilizing the member embeddings as a feature in an input layer of a neural network model, which allows the neural network model to learn which dimension is important as well as an affinity between, for example, user and entity or item. This may also include using the embeddings as raw features in an XGBoost model. Furthermore, the embeddings could also be used in a two-tower application-specific (multi-task) model that fine-tunes user embeddings to that the similarity of user embeddings is directly related to the tasks. For example, if a source user embedding is similar to a destination user embedding, the corresponding user may be more likely to send or accept connection invitations. This can be useful in situations where users with similar session patterns do not necessarily imply they wish to connect. Here, the two-tower structure can provide a similarity score of any user pairs that the downstream application could use as a single numerical feature.

Furthermore, the embeddings may also be used for candidate generations, based on the distance property of the embeddings. Specifically, assuming the distance of embeddings is related to an application objective, then if a user A is a good candidate for user A, then those users that are close to user B in the embedding space may also be good candidates of user A.

Figure 8:
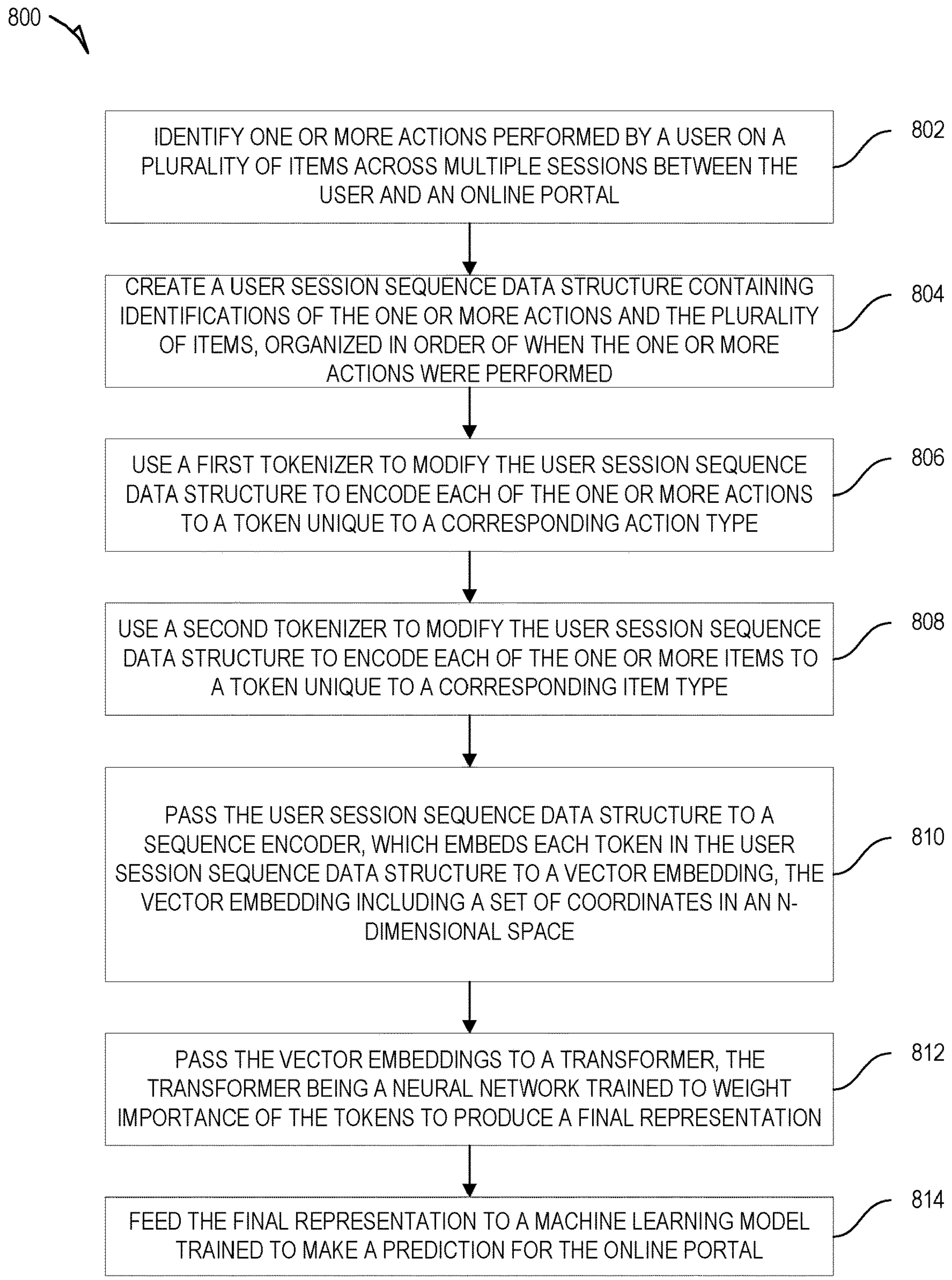
FIG. 8 is a flow diagram illustrating a method, in accordance with an example embodiment.

FIG. 8 is a flow diagram illustrating a method 800, in accordance with an example embodiment. At operation 802, one or more actions performed by a user on a plurality of items across multiple sessions between the user and an online portal are identified. The plurality of items includes items of different item types. At operation 804, a user session sequence data structure is created containing identifications of the one or more actions and the plurality of items, organized in order of when the one or more actions were performed.

At operation 806, a first tokenizer is used to modify the user session sequence data structure to encode each of the one or more actions to a token unique to a corresponding action type. At operation 808, a second tokenizer is used to modify the user session sequence data structure to encode each of the one or more items to a token unique to a corresponding item type. At operation 810, the user session sequence data structure is passed to a sequence encoder, which embeds each token in the user session sequence data structure to a vector embedding. The vector embedding includes a set of coordinates in an n-dimensional space, wherein distance between vector embeddings in the n-dimensional space is indicative of similarity of data represented by corresponding tokens.

At operation 812, the vector embeddings are passed to a transformer. The transformer is a neural network trained to weight importance of the tokens to produce a final representation. At operation 814, the final representation is fed to a machine learning model trained to make a prediction for the online portal.

Figure 9:
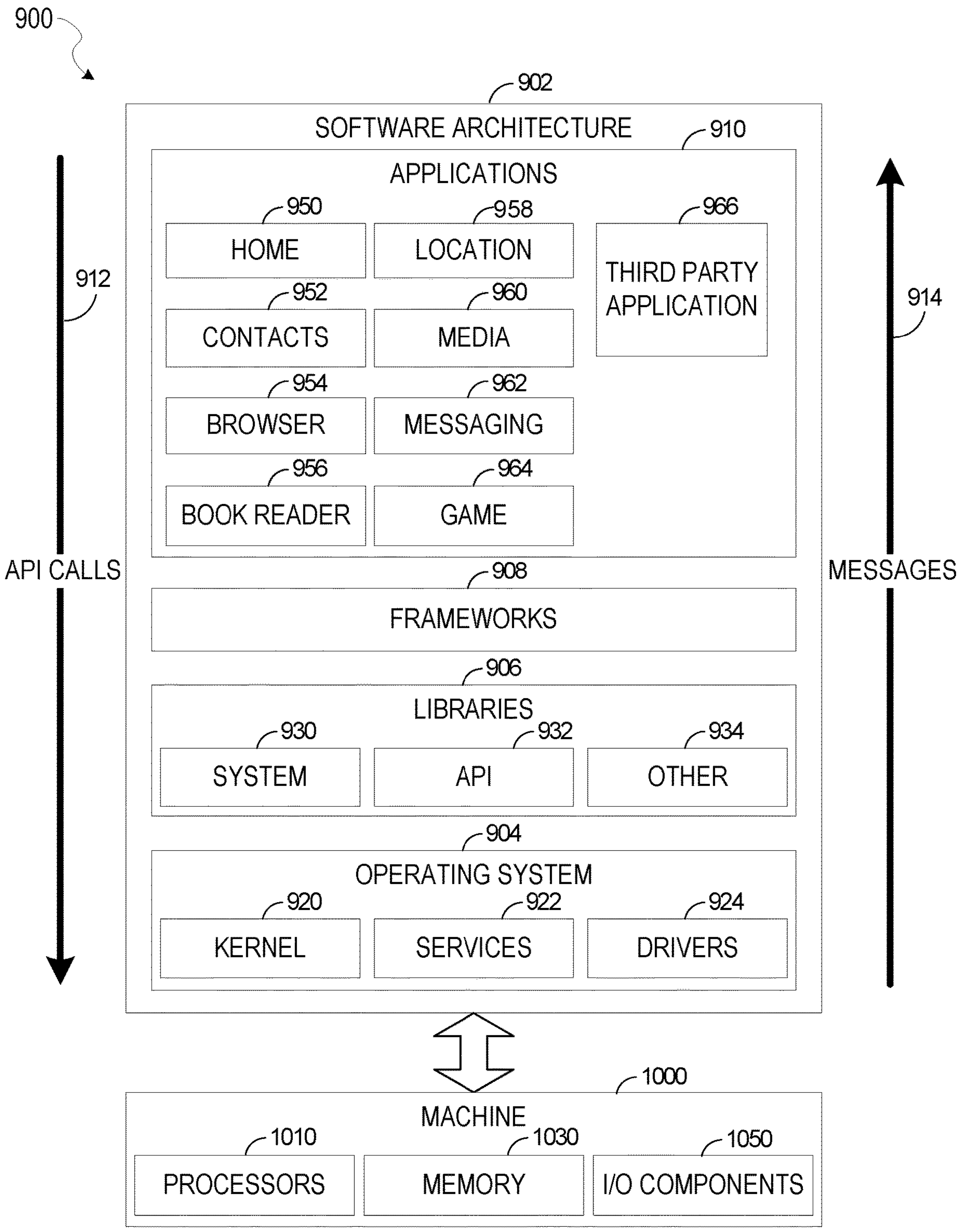
FIG. 9 is a block diagram illustrating a software architecture, which can be installed on any one or more of the devices described above.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
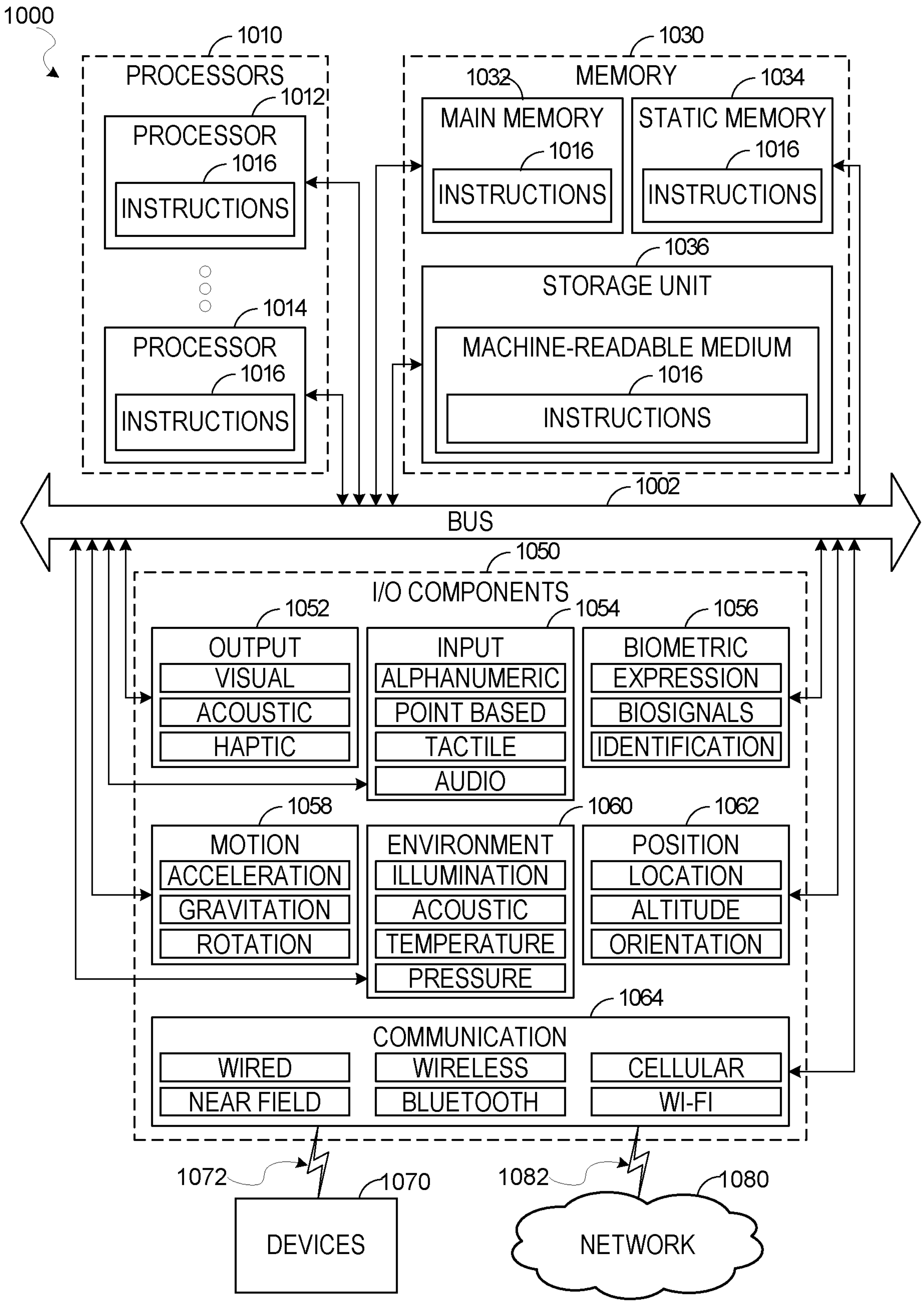
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein may be executed. For example, the instructions 1016 may cause the machine 1000 to execute the method 800 of FIG. 8 respectively. Additionally, or alternatively, the instructions 1016 may implement FIGS. 1-8, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors 1012 (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor), multiple processors 1010 with a single core, multiple processors 1010 with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine 1000 will depend on the type of machine 1000. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1016 and/or data. The terms shall accordingly be taken to include, but not be limited to, solid-state memories, and optical and magnetic media, including memory internal or external to the processors 1010. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

a non-transitory computer-readable medium having instructions stored thereon, which, when executed by a processor, cause the system to perform operations comprising:

identifying one or more actions performed by a user on a plurality of items across multiple sessions between the user and an online portal, the plurality of items including items of different item type;

identifying one or more actors associated with the one or more items;

creating a user session sequence data structure, containing identifications of the one or more actions and the plurality of items, organized in order of when the one or more actions were performed, wherein the creating includes creating a session sequence data structure containing identifications of the one or more actions, the plurality of items, and the one or more actors, organized in order of when the one or more actions were performed;

using a first tokenizer to modify the user session sequence data structure to encode each of the one or more actions to a token unique to a corresponding action type;

using a second tokenizer to modify the user session sequence data structure to encode each of the one or more items to a token unique to a corresponding item type;

passing the user session sequence data structure to a sequence encoder, which embeds each token in the user session sequence data structure to a vector embedding, the vector embedding including a set of coordinates in an n-dimensional space, wherein distance between vector embeddings in the n-dimensional space is indicative of similarity of data represented by corresponding tokens;

passing the vector embeddings to a neural network to produce a final representation; and feeding the final representation to a machine learning model trained to make a prediction for the online portal.

2. The system of claim 1, wherein the neural network is a transformer including a self-attention mechanism and a feed-forward neural network, the self-attention mechanism acting to weight importance of the tokens and the feed-forward neural network applying non-linear transformations to each token's representation from the self-attention mechanism.

3. The system of claim 1, wherein the sequence encoder includes a first embedding layer corresponding to actions and a second embedding layer corresponding to items.

4. The system of claim 3, wherein the operations further comprise:

identifying one or more services in which the one or more actions were performed;

wherein the creating includes creating a session sequence data structure containing identifications of the one or more services, the one or more actions and the plurality of items, organized in order of when the one or more actions were performed;

wherein the first tokenizer further modifies the user session sequence data structure to encode each combination of service and action to a token unique to a corresponding combination of service and action type.

5. The system of claim 4, wherein the first embedding layer further corresponds to a combination of services and actions.

6. The system of claim 3, wherein the sequence encoder further includes a third embedding layer corresponding to actors.

7. The system of claim 3, wherein the sequence encoder includes a third embedding layer corresponding to user feature, and wherein the operations further comprise passing user features corresponding to the user to the third embedding layer for embedding in the vector embedding.

8. A method comprising:

identifying one or more actions performed by a user on a plurality of items across multiple sessions between the user and an online portal, the plurality of items including items of different item type;

identifying one or more services in which the one or more actions were performed;

creating a user session sequence data structure containing identifications of the one or more actions and the plurality of items, organized in order of when the one or more actions were performed, wherein the creating includes creating a session sequence data structure containing identifications of the one or more services, the one or more actions and the plurality of items, organized in order of when the one or more actions were performed;

using a first tokenizer to modify the user session sequence data structure to encode each of the one or more actions to a token unique to a corresponding action type, wherein the first tokenizer further modifies the user session sequence data structure to encode each combination of service and action to a token unique to a corresponding combination of service and action type;

using a second tokenizer to modify the user session sequence data structure to encode each of the one or more items to a token unique to a corresponding item type;

passing the user session sequence data structure to a sequence encoder, which embeds each token in the user session sequence data structure to a vector embedding, the vector embedding including a set of coordinates in an n-dimensional space, wherein distance between vector embeddings in the n-dimensional space is indicative of similarity of data represented by corresponding tokens;

passing the vector embeddings to a neural network to produce a final representation; and feeding the final representation to a machine learning model trained to make a prediction for the online portal.

9. The method of claim 8 wherein the neural network is a transformer including a self-attention mechanism and a feed-forward neural network, the self-attention mechanism acting to weight importance of the tokens and the feed-forward neural network applying non-linear transformations to each token's representation from the self-attention mechanism.

10. The method of claim 8, wherein the sequence encoder includes a first embedding layer corresponding to actions and a second embedding layer corresponding to items.

11. The method of claim 10, wherein the first embedding layer further corresponds to a combination of services and actions.

12. The method of claim 10, further comprising:

identifying one or more actors associated with the one or more items; and wherein the creating includes creating a session sequence data structure containing identifications of the one or more actions, the plurality of items, and the one or more actors, organized in order of when the one or more actions were performed.

13. The method of claim 12, wherein the sequence encoder further includes a third embedding layer corresponding to actors.

14. The method of claim 10, wherein the sequence encoder include a third embedding layer corresponding to user feature and wherein the method further comprises passing user features corresponding to the user to the third embedding layer for embedding in the vector embedding.

15. A non-transitory machine-readable storage medium comprising instructions which, when implemented by one or more machines, cause the one or more machines to perform operations comprising:

identifying one or more actions performed by a user on a plurality of items across multiple sessions between the user and an online portal, the plurality of items including items of different item type;

identifying one or more services in which the one or more actions were performed;

creating a user session sequence data structure containing identifications of the one or more actions and the plurality of items, organized in order of when the one or more actions were performed, wherein the creating includes creating a session sequence data structure containing identifications of the one or more services, the one or more actions and the plurality of items, organized in order of when the one or more actions were performed;

using a first tokenizer to modify the user session sequence data structure to encode each of the one or more actions to a token unique to a corresponding action type, wherein the first tokenizer further modifies the user session sequence data structure to encode each combination of service and action to a token unique to a corresponding combination of service and action type;

using a second tokenizer to modify the user session sequence data structure to encode each of the one or more items to a token unique to a corresponding item type;

passing the user session sequence data structure to a sequence encoder, which embeds each token in the user session sequence data structure to a vector embedding, the vector embedding including a set of coordinates in an n-dimensional space, wherein distance between vector embeddings in the n-dimensional space is indicative of similarity of data represented by corresponding tokens;

passing the vector embeddings to a neural network to produce a final representation; and feeding the final representation to a machine learning model trained to make a prediction for the online portal.

16. The non-transitory machine-readable storage medium of claim 15, wherein the neural network is a transformer including a self-attention mechanism and a feed-forward neural network, the self-attention mechanism acting to weight importance of the tokens and the feed-forward neural network applying non-linear transformations to each token's representation from the self-attention mechanism.

17. The non-transitory machine-readable storage medium of claim 15, wherein the sequence encoder includes a first embedding layer corresponding to actions and a second embedding layer corresponding to items.

* * * * *